US010469360B1

United States Patent
Bhat et al.

(10) Patent No.: US 10,469,360 B1
(45) Date of Patent: Nov. 5, 2019

(54) REVERSE METRIC ADVERTISEMENT FOR BORDER GATEWAY PROTOCOL ROUTE REFLECTION INHIERARCHICAL NETWORKS

(71) Applicant: Juniper Networks, Inc., Sunnyvale, CA (US)

(72) Inventors: Bharath RadhaKrishna Bhat, Bangalore (IN); Shraddha Hegde, Bangalore (IN); Salih K A, Thodupuzha (IN)

(73) Assignee: Juniper Networks, Inc., Sunnyvale, CA (US)

( * ) Notice: Subject to any disclaimer, the term of this patent is extended or adjusted under 35 U.S.C. 154(b) by 204 days.

(21) Appl. No.: 14/871,788

(22) Filed: Sep. 30, 2015

(51) Int. Cl.
*H04L 12/733* (2013.01)
*H04L 12/721* (2013.01)

(52) U.S. Cl.
CPC ............ *H04L 45/122* (2013.01); *H04L 45/06* (2013.01); *H04L 45/123* (2013.01)

(58) Field of Classification Search
CPC ......... H04L 45/02; H04L 45/12; H04L 45/50; H04L 49/35; H04L 45/06; H04L 45/122; H04L 45/123
See application file for complete search history.

(56) References Cited

U.S. PATENT DOCUMENTS

| | | | |
|---|---|---|---|
| 6,370,119 B1 * | 4/2002 | Basso | ...................... H04L 45/12 370/252 |
| 7,184,437 B1 | 2/2007 | Cole et al. | |
| 8,339,959 B1 | 12/2012 | Moisand et al. | |
| 2005/0041590 A1 * | 2/2005 | Olakangil | ............... H04L 45/00 370/238 |
| 2006/0010249 A1 * | 1/2006 | Sabesan | .................. H04L 45/02 709/238 |

(Continued)

FOREIGN PATENT DOCUMENTS

WO 2013184846 A1 12/2013

OTHER PUBLICATIONS

T. Clausen, The Optimized Link State Routing Protocol, version 2, Internet Engineering Task Force (IETF), 1-110 (Year: 2013).*

(Continued)

*Primary Examiner* — Benjamin H Elliott, IV
*Assistant Examiner* — Prince A. Mensah
(74) *Attorney, Agent, or Firm* — Shumaker & Sieffert, P.A.

(57) ABSTRACT

In one example, a method includes by a first network device positioned on a border of a first area of a multi-area hierarchical network and a second area of the multi-area hierarchical network, determining a cost associated with sending network traffic from a client group to the first network device, wherein the client group is positioned in the first area, the first area and the second area being distinct routing domains of the multi-area hierarchical network; and outputting, by the first network device to a second network device positioned in the second area, a routing advertisement that specifies the determined cost as a reverse metric. In some examples, a route reflector receives the routing advertisement and based on the cost from the client group to the area border network device, selects an egress point from among a plurality of egress points of the multi-area hierarchical network.

28 Claims, 4 Drawing Sheets

(56) References Cited

U.S. PATENT DOCUMENTS

| | | | |
|---|---|---|---|
| 2006/0153067 A1* | 7/2006 | Vasseur | H04L 45/02 370/217 |
| 2007/0064613 A1* | 3/2007 | Qian | H04L 45/12 370/238 |
| 2007/0214275 A1* | 9/2007 | Mirtorabi | H04L 45/02 709/230 |
| 2012/0069847 A1* | 3/2012 | Saad | H04L 45/02 370/392 |
| 2016/0218917 A1* | 7/2016 | Zhang | H04L 49/35 |
| 2016/0248663 A1* | 8/2016 | Patel | H04L 45/12 |

OTHER PUBLICATIONS

Bates et al., "BGP Route Reflection: An Alternative to Full Mesh Internal BGP (IBGP)," RFC 4456, Network Working Group, The Internet Society, Apr. 2006, 12 pp.

Li et al., IS-IS Extensions for Traffic Engineering, RFC 5305, Network Working Group, The IETF Trust, Oct. 2008, 17 pp.

Raszuk et al., "BGP Optimal Route Reflection (BGP-ORR)." Network Working Group Internet Draft, draft-ietf-idr-bgp-optimal-route-reflection-10, Jul. 2, 2015, 9 pp.

U.S. Appl. No. 14/042,614, by Nitin Bahadur, filed Sep. 30, 14, 2013.

U.S. Appl. No. 14/788,602, by David C. Wood, filed Jun. 30, 2015.

Psenak, "OSPFv2 Prefix/Link Attribute Advertisement," Network Working Group Internet-Draft, Aug. 12, 2014, 13 pp.

* cited by examiner

REVERSE METRIC ADVERTISEMENT FOR BORDER GATEWAY PROTOCOL ROUTE REFLECTION IN HIERARCHICAL NETWORKS

TECHNICAL FIELD

The disclosure relates to computer networks and, more particularly, to routing network traffic within computer networks.

BACKGROUND

Typically, a device responsible for routing data through a computer network, such as a router, implements one or more intra-network routing protocols commonly referred to as interior gateway protocols (IGPs) to exchange routing information describing links or paths within a network domain. Example IGPs include an Intermediate System to Intermediate System (IS-IS) routing protocol and an Open Shortest Path First (OSPF) routing protocol. The router may then resolve the routing information by selecting a path through the network for reaching each available destination within the network and generating forwarding information, which may be used to forward data packets through the computer network.

Both the IS-IS and OSPF routing protocols fall within a class of routing protocols referred to as link-state protocols. Link state protocols advertise or otherwise facilitate the exchange of routing information by generating and transmitting link state advertisements describing a state of a link between any two adjacent routers within the computer network. These link state advertisements may include information identifying an interface cost or metric associated with an interface to which the link connects and a link cost or metric associated with the link.

Another routing protocol is Border Gateway Protocol (BGP). BGP route reflection is one way to distribute BGP routes between BGP speakers belonging to the same administrative domain. In layer three (L3) Virtual Private Network (VPN) scenarios, a Route Reflector (RR) is not placed in the forwarding path of the packet, but requires the traffic to be tunneled from an Autonomous System (AS) ingress Provider Edge (PE) router to an egress PE router of the network.

'Hot-potato-routing' refers to a common routing paradigm in these BGP deployments that attempts to direct traffic to the closest AS egress point in cases where no higher priority policy dictates otherwise. As a consequence of the route reflection method, the choice of egress point for an RR and its clients will be the egress point closest to the RR and not necessarily closest to the RR clients.

SUMMARY

In general, this disclosure describes techniques for use in hierarchical networks having multiple areas, to enable a route reflector to select an egress point from a hierarchical network as a best next hop for a route reflector client positioned in a different area than the route reflector, where the selected egress point has a lowest cost from a route reflector client. A hierarchical network may be, for example, an administrative domain (e.g., a single autonomous system) having multiple areas in the same autonomous system.

Multi-area hierarchical networks are an important network configuration for many reasons. For example, because as networks are growing larger in terms of traffic handled by the network as well as the overall number of routing and switching nodes, dividing networks hierarchically into multiple IGP areas may provide scalability and administrative ease. Moreover, as redundancy planning and multi-homing are becoming important in networks, it is becoming common to have multiple exit-points (Area Border Routers) to an IGP-area. In addition, the down-link capacity of a link in a network could be more than that of the up-link capacity of the link. In such cases traffic flow can take different path in upward and downward direction. The techniques described herein can readily be applied in multi-area network to enhance, for example, performance and scalability.

In one example, a method includes by a first network device positioned on a border of a first area of a multi-area hierarchical network and a second area of the multi-area hierarchical network, determining a cost associated with sending network traffic from a client group to the first network device, wherein the client group is positioned in the first area, the first area and the second area being distinct routing domains of the multi-area hierarchical network; and outputting, by the first network device to a second network device positioned in the second area, a routing advertisement message that specifies the determined cost as a reverse metric.

In another example, a method includes receiving, by a route reflector network device positioned in a first area of a multi-area hierarchical network, from an area border network device positioned on a border of the first area and a second area of the multi-area hierarchical network, a routing advertisement message that specifies a cost associated with sending network traffic from a client group to the area border network device, wherein the client group is positioned in the first area, the first area and the second area being distinct routing domains of the multi-area hierarchical network; and in response to receiving the routing advertisement message, selecting, by the route reflector network device and based on the cost from the client group to the area border network device, an egress point from among a plurality of egress points of the multi-area hierarchical network to which to send traffic from the client group destined for a destination reachable via the plurality of egress points.

In a further example, a network device is positioned on a border of a first area of a multi-area hierarchical network and a second area of the multi-area hierarchical network, the network device comprising: a memory configured to store instructions; and one or more processors in communication with the configuration interface and the memory and configured to: determine a cost associated with sending network traffic from a client group to the network device, wherein the client group is positioned in the first area, the first area and the second area being distinct routing domains of the multi-area hierarchical network; and output, to a second network device positioned in the second area, a routing advertisement message that specifies the determined cost as a reverse metric.

In another example, a network device is positioned in a first area of a multi-area hierarchical network, the network device comprising: a memory configured to store instructions; and one or more processors in communication with the configuration interface and the memory and configured to: receive, from an area border network device positioned on a border of the first area and a second area of the multi-area hierarchical network, a routing advertisement message that specifies a cost associated with sending network traffic from a client group to the area border network device, wherein the client group is positioned in the first area, the first area and the second area being distinct routing domains of the multi-area hierarchical network; and in response to receiving the routing advertisement message, select based on the cost from the client group to the area border network device, an egress point from among a plurality of egress points of the multi-area hierarchical network to which to send traffic from the client group destined for a destination reachable via the plurality of egress points.

In a further example, a non-transitory computer-readable medium includes instructions that, when executed, cause one or more processors of a network device to: determine a cost associated with sending network traffic from a client group to the network device, wherein the client group is positioned in the first area of a multi-area hierarchical network; and output to a second network device positioned in a second area of the multi-area hierarchical network, a routing advertisement message that specifies the determined cost as a reverse metric, the first area and the second area being distinct routing domains of the multi-area hierarchical network.

In yet another example, a non-transitory computer-readable device includes instructions that, when executed, cause one or more processors of a network device to: receive, from an area border network device positioned on a border of a first area and a second area of a multi-area hierarchical network, a routing advertisement message that specifies a cost associated with sending network traffic from a client group to the area border network device, wherein the client group is positioned in the first area, the first area and the second area being distinct routing domains of the multi-area hierarchical network; and in response to receiving the routing advertisement message, select based on the cost from the client group to the area border network device, an egress point from among a plurality of egress points of the multi-area hierarchical network to which to send traffic from the client group destined for a destination reachable via the plurality of egress points.

The details of one or more examples are set forth in the accompanying drawings and the description below. Other features, objects, and advantages will be apparent from the description and drawings, and from the claims.

DETAILED DESCRIPTION

Figure 1:
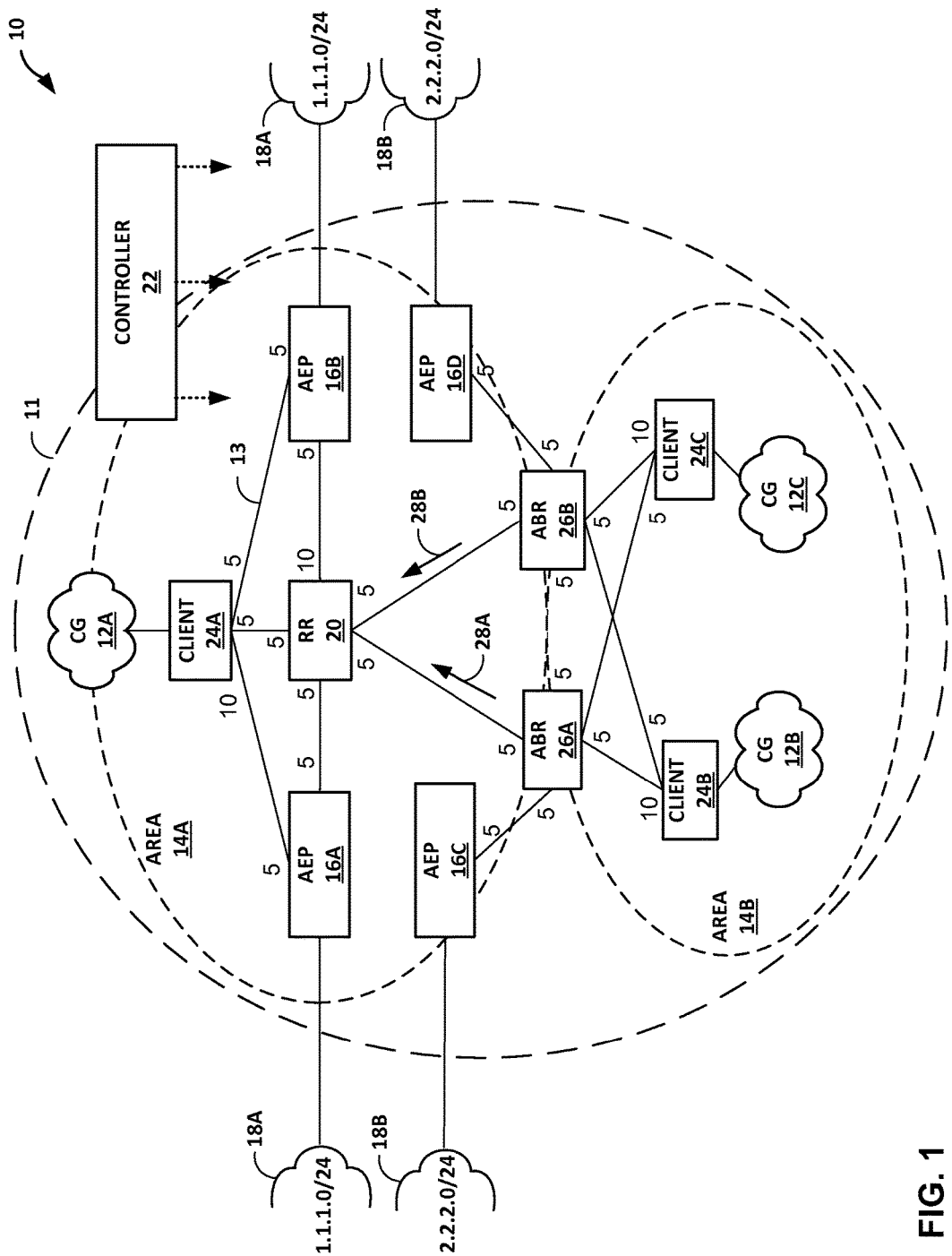
FIG. 1 is a block diagram illustrating an example network system that implements the techniques described in this disclosure.

FIG. 1 is a block diagram illustrating an example network system 10 that implements the techniques described in this disclosure. Network system 10 includes a computer network 11 (e.g., a service provider network) partitioned into a plurality of areas 14A-14B ("areas 14"). Network 11 is a single administrative domain and an autonomous system (AS), and each of areas 14 represents a distinct routing domain within the AS, in the sense that generally limited routing information is shared between the areas. Areas 14 may, for example, comprise separate routing domains such as Interior Gateway Protocol (IGP) hierarchical levels or areas so that network prefix information is shared between the levels or areas using an IGP routing protocol.

When using a link-state IGP, such as the Open Shortest Path First protocol (OSPF) or Intermediate System to Intermediate System protocol (IS-IS), each router would normally possess information about the complete network topology. As a network grows large, scaling within the network may be necessary to manage the amount of network topology information exchanged by routers in the network. Link-state IGPs, such as IS-IS or OSPF, address network scaling issues by hierarchically separating a network into multiple hierarchical areas or levels so as to increase routing scalability. For example, OSPF areas or IS-IS levels may be used to hierarchically partition the network into distinct areas, such as a backbone area that includes core routers, and one or more non-backbone areas. OSPF and IS-IS allow an autonomous system to, for example, be partitioned into different areas or levels so as to increase routing scalability within a routing domain. Network devices within any IGP area or level within the partitioned network need only maintain link state for the routers within the respective area. In this way, each of the IGP areas or levels many be viewed as a separate routing domain within the partitioned network, and link state information need not generally be exchanged between all of the routers of different areas, thus reducing the link-state information in the routing information base (RIB) maintained by each of the routers.

Using an IGP that employs such hierarchical scaling, each router in a given area stores both topological and reachability information for only other devices in the same area, and maintains only reachability information for all other areas in the network.

AEPs 16, route reflector 20, area border routers (ABRs) 26A-26B ("ABRs 26") and clients 24A-24C ("clients 24") each maintain routing information that describes available routes through network 11. In this sense, AEPs 16, route reflector 22, ABRs 26, and clients 24 are network devices that may be or may include routers. Upon receiving an incoming packet, these network devices examine information within the packet and forward the packet in accordance with their stored routing information. In order to maintain an accurate representation of network 11, the network devices exchange routing information in accordance with a defined routing protocol, such as an Interior Gateway Protocol (IGP). Network 11 may be partitioned into hierarchical IGP areas 14 to facilitate routing scalability of network 11. For example, areas 14 may be Open Shortest Path First protocol (OSPF) areas or Intermediate System to Intermediate System protocol (IS-IS) levels.

Area border routers (ABRs) are routers that are located on the border of two or more areas 14 of network 11. As illustrated in FIG. 1, areas 14 include AS egress points (AEPs) 16A-16D ("AEPs 16"). AEPs 16 may be provider edge (PE) routers having connectivity to other network devices in separate networks (not shown), such as customer edge devices or subscriber devices. AEPs 16 may provide the other network devices with access to network 11. AEPs 16 are network devices that provide an exit point, or egress point, to network 11 for sending traffic to network devices in other autonomous systems. Using BGP, AEPs 16 learns BGP prefixes outside of the autonomous system represented by network 11. The IGPs on the routers within AS know only of the AEPs 16. The BGP instance running on RR 20 learns which prefixes are advertised by which AEP 16, and as described herein helps identify the correct AEP based on information obtained from IGP as to which AEP is closest to the client 24. In the example of FIG. 1, AEP 16A and AEP 16B are both egress points for BGP prefix 1.1.1.0/24, represented by network 18A. AEP 16C and AEP 16D are both egress points for BGP prefix 2.2.2.0/24, represented by network 18B. Although described for purposes of example as "/24" prefixes, the BGP prefixes learned by AEPs 16 may actually be individual loopback addresses on individual routers, which are each "/32" prefixes.

Route reflector ("RR") 20 is a BGP route reflector, as described in T. Bates, "BGP Route Reflection—An Alternative to Full Mesh Internal BGP (IBGP)," Network Working Group RFC 4456, April 2006, the entire contents of which being incorporated by reference herein. BGP Route Reflection relaxes the rules in BGP that prevent routing loops in BGP topologies. In other words, an IBGP router called a route reflector (RR) can re-advertise network layer reachability information (NLRI) received from one IBGP router to other IBGP routers.

A group of BGP-clients are grouped into a client-group, which is represented by a primary router. That is, RR 20 communicates with all the routers in the client group (e.g., sends add-path message). In some cases, multiple routers in proximity form a logical group. For example, the client groups may be configured on ABRs 26 as corresponding to "peer groups" in BGP. Choosing one of the multiple routers as a primary router to represent the group allows the IGP compute SPF on behalf of this primary and use this as a reasonable approximation of costs from all routers of this group to various AEPs. Identifying a primary router reduces the number of SPFs the RR 20 would have to perform. Client 24A is a BGP client (e.g., a router) that is a BGP client that is a primary client member of the client group 12A in area 14A. Clients 24B, 24C are BGP clients that are primary client members of client groups 12B and 12C, respectively, in area 14B. Clients groups 12A-12C ("client groups 12") represent groups of network devices that are BGP peers with route reflector 20, but that may not be BGP peers with other ones of client groups 12. Each of client groups 24 may represent a plurality of network devices, such as routers.

In the simple intra-area case within area 14A, RR 20 performs a shortest path first (SPF) computation on behalf of the primary of each client-group in its area. In the example of FIG. 1, RR 20 performs SPF on behalf of CG 24A. In this way, the RR 20 selects the Egress Point closest to the Client-group rather than closest to itself.

For example, in FIG. 1, if RR 20 had done SPF rooted on itself, for Prefix 18A, AEP 16A would have been chosen as Egress Point (because the metric is 5 from RR 20). However, this is not closest to the client-group CG 24A (metric 10). By computing SPF based on CG 24A, it is possible to find the Egress Point, AEP 16B (metric 5) which is closest to the Client-group CG 24A

As a result of the hierarchical nature of network 11, it is non-trivial for RR 20 to find the best BGP-next-hop for client-groups residing in areas other than the Router Reflector 20, such as CGs 24B and 24C, which reside in area 14B whereas RR 20 resides in area 14A. For example, RR 20 needs to determine a BGP next hop to which to forward network traffic received from CGs 24B or 24C and destined for prefix 18A. RR 20 can choose either AEP 16A or AEP 16B for a BGP next hop destined for prefix 18A. Similarly, RR 20 can choose either AEP 16C or AEP 16C for a BGP next hop to which to forward traffic destined for prefix 18B. The best path chosen by the route reflector 20 is not necessarily the same as the path which would have been chosen by the client (e.g., client 24B) if the client had considered the same set of candidate paths as the route reflector 20. The path chosen by the client would have guaranteed the lowest cost and delay trajectory through the network. As described in further detail below, the techniques of this disclosure provide a mechanism to facilitate RR 20's choice of BGP next hop for client groups positioned in a different area than RR 20.

Multi-area hierarchical networks are an important deployment scenario because as networks are growing larger, dividing them hierarchically into multiple IGP areas gives scalability and administrative ease. Moreover, as redundancy planning and multi-homing is becoming important in networks, it is quite common to have multiple exit-points (Area Border Routers) to an IGP-area. In addition, the down-link capacity of a link 13 in network 11 could be more than that of the up-link capacity of the link. In such cases traffic flow can take different path in upward and downward direction. One way this could be achieved is by assigning differing link costs on both ends of the links.

FIG. 1 illustrates the costs associated with each interface coupling links 13 to the respective network devices. Cost is the metric that an IGP such as OSPF or IS-IS uses to judge a path's feasibility and select a path to use from among several paths. For example, the cost associated with the interface of ABR 26A for sending traffic from the interface from ABR 26A to CG 24B is 10, while the cost associated with the interface of CG 24B for sending traffic from the interface from CG 24B to ABR 26A is 5.

This disclosure describes techniques that help RR 20 to identify one or more optimal Egress Points in hierarchical networks such as network 11. Route reflector 20 in area 14A utilizes accurate routing metrics from Client Groups 12B, 12C that are located in a different area 14B to ABR(s) on the border of areas 14A, 14B, for computing the correct Egress Point for sending network traffic to routing destinations external to the autonomous system of network 11. According to techniques described herein, ABRs 26 are configured to compute Reverse SPF (RSPF) to nodes within each of the areas to which they are attached. Reverse SPF gives the cost from each of the nodes (destination) to the source (the computing node, i.e., the computing ABR).

To accomplish this efficiently, each of ABRs 26 may actually perform the normal SPF as a source node, but may employ a modified SPR path selection process that utilizes the cost of the incoming interface of the ABR rather than the outgoing interface that is used in normal SPF. In some examples, the mechanism used to compute the reverse metric may be a part of RLFA (Remote Loop Free Alternative) configuration on ABRs 26.

ABRs 26 then make available to RR 20 the computed reverse metric to each of the client-groups such that RR 20 can utilize the reverse metrics for selection of an AS egress points (AEPs) 16 to advertise as a next hop for sending traffic from the client-groups to a destination reachable via the AEPs 16. For example, ABRs 26 can perform some route-leaking between areas 14 using an IGP to advertise the computed reverse metric. According to this disclosure, along with advertising cost from ABRs 26 to nodes/prefixes in the area, IGPs are extended to also advertise the reverse cost (the cost from client nodes to the ABRs 26).

For example, ABRs 26 may be configured to compute the reverse metric in a first area, and ABRs 26 may be configured with an extended IGP to advertise the reverse metric to network devices in a second area. For example, it is proposed that, the reverse cost metric for client groups located in a different area of the network than RR 20 may be carried within a separate optional field of respective interior gateway protocol (IGP) messages 28A, 28B sent by ABRs 26A, 26B. For example, IGP messages 28A-28B ("IGP messages 28") may be IS-IS messages or OSPF messages, examples of which are described in more detail below with respect to FIGS. 3 and 4. In some examples, detection of new CG primary will trigger ABRs 26 to compute and send the reverse metric.

RR 20 receives the IGP messages 28 and is configured with the extended IGP to correctly process the IGP messages 28 specifying the reverse metric. With these enhancements, the RR 20 now knows the cost from the client-group to the ABR. RR 20 is configured to determine the total cost from CG to AEP based on the received reverse metric, as follows:

Total cost from CG to AEP=(cost(CG-to-ABR)+cost(ABR-to-Egress_Point)).

Using this total cost calculation, in the example of FIG. 1: Cost from CG 24B to AEP 16C is 15, while cost from CG 24B to AEP 16D is 10. Hence, as per actual cost, AEP 16D is correctly chosen as the actual Egress Point for CG 24B. Cost from CG 24C to AEP 16C is 10, while cost from CG 24C to AEP 16D is 15. Hence, as per actual cost, AEP 16C is correctly chosen as the actual Egress Point for CG 24C.

If reverse cost was not made available to the RR 20, and say, RR 20 had made an assumption that forward and reverse metrics are equal, RR 20 would have incorrectly chosen AEP 16C as the Egress Point for CG 24C. Similarly, RR 20 would have incorrectly chosen AEP 16D as the Egress Point for CG 24B.

After selecting the AEP, RR 20 sends a message to the routers in the client group identifying the selected AEP as the next hop for the routing prefix. For example, RR 20 may send a "BGP-ADD-PATH" message advertising the selected AEP to all the routers in the client group.

Controller 22 may represent a high-level controller for configuring and managing transport network 11. Controller 22 may represent one or more general-purpose servers; an appliance, controller, or other special-purpose device for computing paths; an application executed by a computing device; a distributed control plane of clients 24, ABRs 26, that computes paths for LSPs managed by the routers; and so forth. In some cases, aspects of controller 22 may be distributed among one or more real or virtual computing devices. Any such devices listed above may be in-network or out-of-network with regard to transport network 11. Example details of a software-defined networking (SDN) controller for a software-defined network, which may perform operations described herein to compute paths and route LSPs, are described in PCT International Patent Application PCT/US2013/044378, filed Jun. 5, 2013, and entitled, "PHYSICAL PATH DETERMINATION FOR VIRTUAL NETWORK PACKET FLOWS," which is incorporated by reference herein in its entirety. Additional examples details of an SDN controller for a software-defined network to obtain topology information for and to provision a network are described in U.S. patent application Ser. No. 14/042,614, filed Sep. 30, 2013, and entitled "SOFTWARE DEFINED NETWORK CONTROLLER," and U.S. patent application Ser. No. 14/788,602, filed Jun. 30, 2015, and entitled "Network Topology Optimization with Feasible Optical Paths," which are both incorporated by reference herein in their entireties. In some examples, the reverse metrics advertised as outlined above can find much wider usage. For example, controller 22 in a default area (e.g., area 14A) can obtain the cost of reaching different ABRs from the routers within area 14B. Controller 22 can connect to an IGP peer, typically in a default area, but will typically need to have the view of the entire AS. This is where the reverse metric learned from ABRs from other areas would be useful to controller 22. For example, controller 22 may connect to RR 20 or ABR 26B, and learn the information obtained by ABR 26B about reverse metrics from area 14B. In some examples, ABRs 26B can send routing advertisements 28A, 28B as described herein to controller 22. The information learned from ABRs can help controller 22 predict traffic patterns for traffic transiting area 14B. Controller 22 can receive a route advertisement sent by ABR 26B, where the routing advertisement message specifies the determined cost as a reverse metric; and in response to receiving the routing advertisement message, updating data associated with the first area in a topology database based on the reverse metric.

Some potential advantages of the proposed solution are as follows:

1. The proposed solution identifies the correct Egress Point from a client-group even in case of asymmetric networks (networks in which up-link cost and down-link costs are different), where the client-group and Egress Points are in different areas.

2. No additional extensions are required to compute the reverse paths.

3. Uses simple protocol extensions that require addition of sub-TLV. This is simple to implement. This sub-TLV could have much wider usage in identifying the actual costs from routers of other areas to their respective ABRs. For example, this can be used for network redundancy planning.

4. The proposal does not need the client-routers (which may be older boxes) to be upgraded. The ABRs need to be upgraded with the extended IGPs, but ABRs typically reside in core/core-edge, are well planned, and far lesser in number, so upgrading them is easier.

5. The proposal provides the solution in both IS-IS and OSPF.

Figure 2:
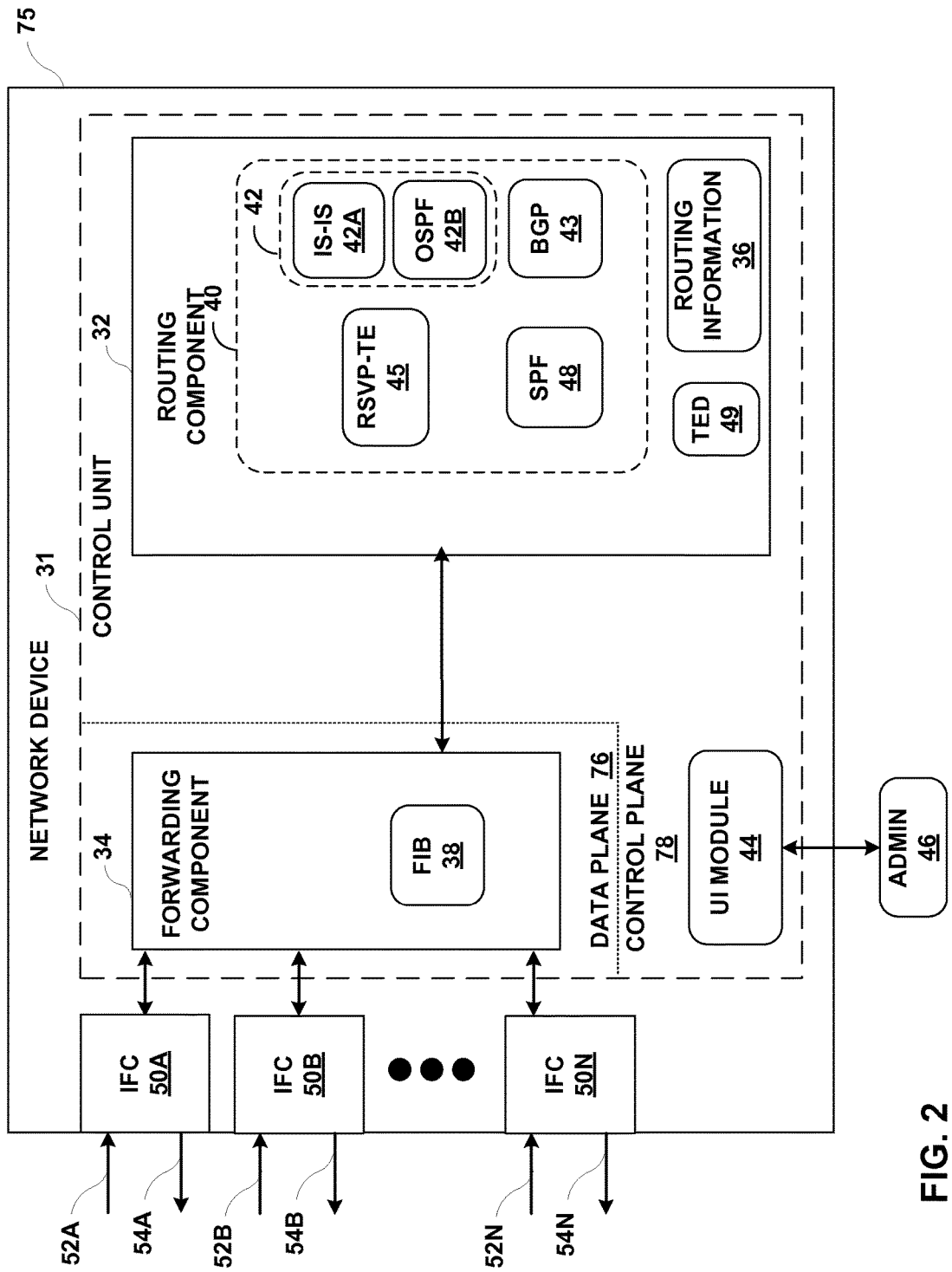
FIG. 2 is a block diagram illustrating an example network device that implements techniques described in this disclosure.

FIG. 2 is a block diagram illustrating an example network device 75 that implements techniques described in this disclosure. Network device 75 may represent either one of ABRs 26 or RR 20 shown in the example of FIG. 1. While described with respect to network device 75, the techniques may be implemented by any other type of network device capable of implementing an interior gateway protocol (IGP) such as the IS-IS routing protocol or the OSPF routing protocol. Thus, while described with respect to network device 75, the techniques should not be limited to example network device 75 described with respect to the example of FIG. 2.

In this example, network device 75 includes a control unit 31 that includes a routing component 32 and a forwarding component 34. In the example of FIG. 2, network device 75 includes interface cards 50A-50N ("IFCs 50") that receive and send data units, such as packet flows, via network links 52A-52N and 54A-54N, respectively. Network device 75 may include a chassis (not shown) having a number of slots for receiving a set of cards, including IFCs 50. Each card may be inserted into a corresponding slot of the chassis for electrically coupling the card to forwarding component 34 and/or routing component 32, e.g., via a high-speed switch and internal data paths (not shown). IFCs 50 may be coupled to network links 52A-52N and 54A-54N via a number of physical interface ports (not shown). Generally, IFCs 50 may each represent one or more network interfaces by which network device 75 may interface with links of a network, such as the links 13 of network 11 shown in the example of FIG. 1.

Control unit 31 of network device 75 includes a control plane 78 and a data plane 76. In the example of FIG. 2, data plane 76 includes forwarding component 34, and control plane 78 includes routing component 32 and controller interface 74. Control unit 31 may comprise one or more of a processor, a programmable processor, a general purpose processor, an integrated circuit, an Application Specific Integrated Circuit (ASIC), a Field Programmable Gate Array (FPGA), or any type of hardware unit capable of implementing the techniques described herein. Control unit 31 may further include a non-transitory computer readable medium or other computer-readable storage device, which may include dynamic memory (e.g., Random Access Memory or RAM, dynamic RAM or DRAM, and a cache) and/or static memory (e.g., static RAM or SRAM, a Read Only Memory or ROM, and Flash memory), and storage devices, such as Compact Disc ROMs or CDROMs, hard drives, RAM drives, and Digital Video Disc (DVD) drives. In some instances, the computer-readable storage medium may include or otherwise store instructions that, when executed, cause a programmable processor to perform the techniques described herein. These instructions may form a computer program, which may comprise software or other executable files.

Routing component 32 may include a user interface (UI) module 44 ("UI module 44"), one or more network protocols 40. UI module 44 may represent a module that presents a user interface with which an administrator or other user, such as administrator 46 ("admin 46"), may interact to configure one or more of routing protocol modules 40, RSVP-TE module 45, as well as routing component 32 generally.

Routing component 32 primarily provides an operating environment for control plane protocols 40. For example, one or more interior gateway protocols (IGPs) 42, such as Intermediate System to Intermediate System (ISIS) routing protocol 42A, or the Open Shortest Path First (OSPF) routing protocol 42B, or Border Gateway Protocol (BGP) 43, maintain routing information 36 to reflect the current topology of a network and other network entities to which network device 75 is connected. In particular, IGPs 42 or BGP 43 can update routing information 36 to accurately reflect the topology of the network and other entities. IS-IS module 42A represents a module that implements the IS-IS routing protocol. OSPF module 42B represents a module that implements the OSPF routing protocol.

Routing component 32 generates and programs forwarding component 34 with FIB 38 that associates network destinations with specific next hops and corresponding interfaces ports of IFCs 50 in accordance with routing information 36. Routing component 32 may generate FIB 38 in the form of a radix tree having leaf nodes that represent destinations within the network, for example.

Based on FIB 38, forwarding component 34 forwards packets received from inbound links 52A-52N to outbound links 54A-54N that correspond to next hops associated with destinations of the packets. U.S. Pat. No. 7,184,437 provides details on an exemplary embodiment of a router that utilizes a radix tree for route resolution. The entire contents of U.S. Pat. No. 7,184,437 are incorporated herein by reference.

In one example, forwarding component 34 is a rich and dynamic shared forwarding plane, which may in some examples be distributed over a multi-chassis router. Moreover, forwarding component 34 may be provided by dedicated forwarding integrated circuits normally associated with high-end routing components of a network router. Further details of one example embodiment of network device 75 can be found in U.S. Pat. No. 8,339,959, issued Dec. 25, 2012, entitled "STREAMLINED PACKET FORWARDING USING DYNAMIC FILTERS FOR ROUTING AND SECURITY IN A SHARED FORWARDING PLANE," the entire contents of which are incorporated herein by reference.

As shown in FIG. 2, protocols 40 executing within routing component 32 includes one or more MPLS protocols for establishing a LSP, which may be accumulated by IGPs 42. For example, RSVP-TE 45 may generate and maintain a traffic engineering database 49, including bandwidth reservations for paths associated with MPLS LSPs. Constrained Shortest Path First (CSPF) process 48 computes a shortest path or paths for an MPLS LSP based on specified constraints and bandwidth availability information associated with the links within the network. IGPs 42 may, in turn, advertise the calculated bandwidth availability information in traffic engineering database (TED) 49 to other peer routers.

Network device 75 can use an MPLS protocol such as RSVP-TE module 45 to send and receive messages for establishing LSPs. RSVP-TE module 45 may also inform IGPs 42 of the established LSPs, which in turn can update TED 49 with current available bandwidth information. IGPs 42 may also forward the updated current available bandwidth information to other IGP peers.

RSVP-TE module 45 may also store MPLS labels to FIB 38 for LSPs 20. FIB 38 may correlate labels associated with incoming MPLS packets with next hops. FIB 38 may include entries associated with an incoming label (e.g., a label at the top of a label stack appended to a packet received by IFCs 50) and an operation or action to take with respect to that incoming label before forwarding the packet to the specified next hop, such as push a new label onto the label stack, swap the incoming label with a label associated with the corresponding entry, or pop the incoming label from the label stack.

While described above as discrete modules 42-46, the modules may be combined to form a single module or unit or may be implemented separately as distinct hardware or software units or components. Reference to individual modules is not meant to reflect actual discrete implementations, and more than one module may be implemented by the same hardware or combination of hardware or software.

Initially, admin 46 may interface with a user interface, such as a command line interface (CLI) or graphical-user interface (GUI), presented by UI module 44 to configure one or more of interior routing protocol modules 42. For example, admin 46 may configure IS-IS module 42A or OSPF module 42B with the extensions described herein. After configuring routing component 32, admin 46 may activate or otherwise enable network device 75 to begin processing packets, including standard IP packets that are forwarded in accordance with forwarding information base (FIB) 38 and label augmented IP packets (which are referred to herein as "MPLS packets"). Prior to receiving these packets, in some examples one or more of interior routing protocol modules 42 may generate an LSA that includes data specifying one or more links, costs associated with the one or more links and other metrics associated with these links, such as an Administrative Group or Shared Risk Link Group.

In some examples, network device 75 may be an area border router, such as one of ABRs 26 of FIG. 1. In this case, network device 75 may be positioned on a border of a first area of a multi-area hierarchical network and a second area of the multi-area hierarchical network. SPF module 48 is configured to determine a cost associated with sending network traffic from a client group to the network device 75, wherein the client group is positioned in the first area, the first area and the second area being distinct routing domains of the multi-area hierarchical network. This cost is referred to herein as a "reverse metric." In some examples, detection of new CG primary will trigger determining and sending the reverse metric from an area border router. For example, SPF module 48 may perform the normal SPF, but considering the cost of the incoming interface rather than the outgoing interface that is used in normal SPF.

After determining the cost, one of IGPs 42 of network device 75 generates a routing advertisement message that specifies the determined cost, and network device 75 outputs, to a second network device positioned in the second network area. For example, IS-IS module 42A can generate a routing advertisement message that specifies the cost in a sub-TLV of an Extended-IP Reachability TLV in an IS-IS link-state packets (LSP). As another example, OSPF module 42B can generate a routing advertisement message that specifies the cost in a sub-TLV of an OSPFv2 Extended Prefix TLV in an OSPF LSA. Network device 75 then outputs the generated routing advertisement message via one of IFCs 50 to the second network device positioned in the second network area (e.g., to a route reflector 20 of FIG. 1) which communicates the reverse metric cost (cost from CG to ABR) to the route reflector in the second area.

Network device 75 may also receive LSAs via IFCs 50 from other LERs or LSRs, such as LERs 14 or LSRs 18. IFCs 50 may be configured to forward routing protocol packets or control packets, such as these received LSAs, to routing component 32. Interior routing protocol modules 46 may then process these LSAs. This one of interior routing protocol modules 42 then stores link data, including its costs and other metrics to routing information 36.

In some examples, network device 75 may be a route reflector, such as RR 20 of FIG. 1. For example, network device 75 may be a route reflector network device positioned in a first area of a multi-area hierarchical network, that receives from a network device positioned on a border of the first area and a second area of the multi-area hierarchical network, a routing advertisement message that specifies a cost associated with sending network from a client group to the network device, wherein the client group is positioned in the first area, the first area and the second area being distinct routing domains of the multi-area hierarchical network. For example, RR 20 receives LSAs including the reverse metric cost, where the LSAs may be IS-IS LSPs or OSPF LSAs.

In response to receiving the routing advertisement message, the respective one of IGPS 42 stores the cost to routing information 36. BGP module 43 selects, based on the cost from a client group to the network device obtained from routing information 36, an egress point from a plurality of egress points of the multi-area hierarchical network for which to forward traffic from the client group destined for a destination reachable via the egress point. BGP module 43 may be configured to select an egress point having a lowest total cost from the client group to the egress point defined as a sum of the cost from the client group to the area border network device plus the cost from the area border network device to the egress point. This selected egress point is the BGP next hop that the route reflector advertises for forwarding traffic to the destination, which may be a prefix such as one of prefixes 18 of FIG. 1. After selecting the AEP, BGP module 43 sends a message to the routers in the client group identifying the selected AEP as the next hop for the routing prefix. For example, BGP module 43 may send a "BGP-ADD-PATH" message advertising the selected AEP to all the routers in the client group.

Control unit 31 may comprise one or more of a processor, a programmable processor, a general purpose processor, an integrated circuit, an Application Specific Integrated Circuit (ASIC), a Field Programmable Gate Array (FPGA), or any type of hardware unit capable of implementing the techniques described herein. Control unit 31 may further include a non-transitory computer readable medium or other computer-readable storage device, which may include dynamic memory (e.g., Random Access Memory or RAM, dynamic RAM or DRAM, and a cache) and/or static memory (e.g., static RAM or SRAM, a Read Only Memory or ROM, and Flash memory), and storage devices, such as Compact Disc ROMs or CDROMs, hard drives, RAM drives, and Digital Video Disc (DVD) drives. In some instances, the computer-readable storage medium may include or otherwise store instructions that, when executed, cause a programmable processor to perform the techniques described herein. These instructions may form a computer program, which may comprise software or other executable files.

Figure 3:
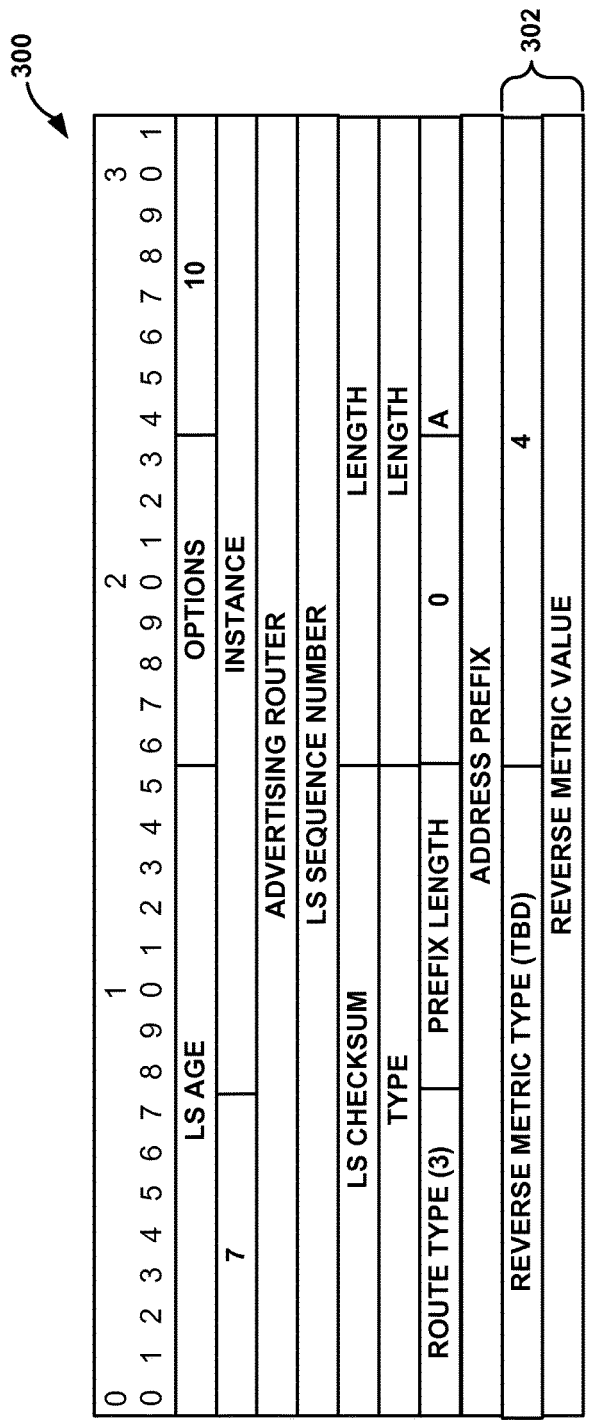
FIG. 3 is a block diagram illustrating an example OSPF link-state advertisement (LSA) with a proposed new sub-TLV.

FIG. 3 is a block diagram illustrating an example OSPF link-state advertisement (LSA) 300 with a proposed new sub-TLV 302. In one example, OSPF would be extended to add a new sub-TLV 302 under the existing area-scope Opaque LSA, 'OSPFv2 Extended Prefix TLV', to advertise the reverse metric. One LSA would advertise reverse metric to one prefix. This is consistent with other LSA's behavior in OSPF. Multiple LSAs can be combined into an LSUpdate, just like any other LSAs in OSPF.

The reverse metric would be advertised for the prefix corresponding to the primary loopback IP address of the client-group, which is used as the BGP peering endpoint. The OSPFv2 Extended Prefix TLV is described in P. Psanak, "OSPFv2 Prefix/Link Attribute Advertisement," Network Working Group Internet-Draft, Aug. 12, 2014, the entire contents of which are incorporated by reference herein.

Figure 4:
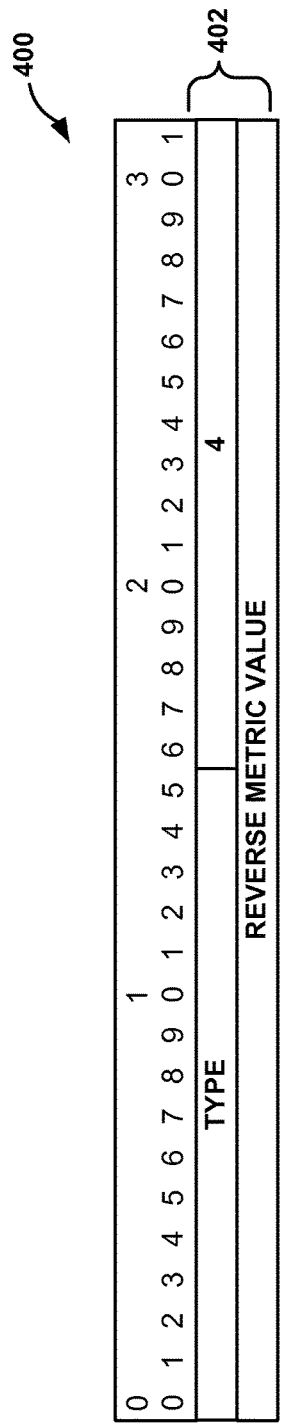
FIG. 4 is a block diagram illustrating an example IS-IS advertisement with a proposed new sub-TLV.

FIG. 4 is a block diagram illustrating an example IS-IS advertisement 400 with a proposed new sub-TLV 402. The IS-IS advertisement 400 would be generated and sent by IS-IS module 42A of network device 75, for example. In one example, the IS-IS Extended-IP Reachability TLV would contain a Reverse-metric-sub-TLV 402, to carry the reverse metric information. The IS-IS Extended-IP Reachability TLV is described in T. Li, "IS-IS Extensions for Traffic Engineering," Network Working Group RFC 5305, October 2008, the entire contents of which are incorporated by reference herein.

Figure 5:
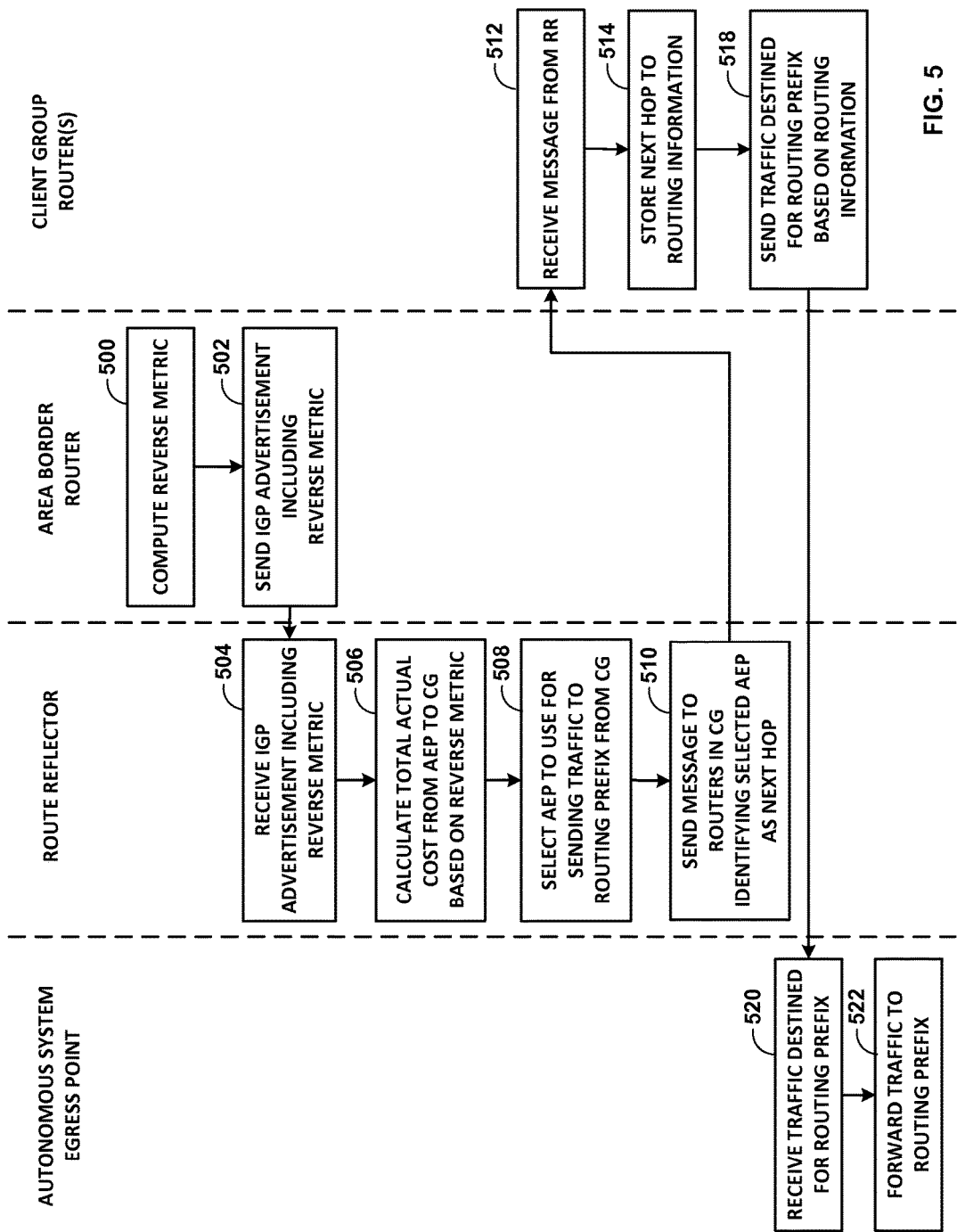
FIG. 5 is a flowchart illustrating example operation of one or more network devices in performing the techniques described in this disclosure.

FIG. 5 is a flowchart illustrating example operation of one or more network devices in performing the techniques described in this disclosure. For purposes of example, FIG. 5 will be described with respect to client 24B, ABR 26A, RR 20, and AEP 16C of FIG. 1.

ABR 26A computes the reverse metric indicating the cost from each of its peers to itself, including the cost from client 24B to ABR 26A (500). ABR 26A sends an IGP advertisement including the reverse metric(s) to RR 20 (502).

RR 20 receives the IGP advertisement that includes the reverse metric(s) (504). RR 20 may also receive similar IGP advertisements from other ABRs. RR 20 calculates the total actual cost from each AEP to each client based on the reverse metric(s) received via the IGP advertisement(s) from the one or more ABRs to which RR 20 is connected (506). For example, RR 20 may be configured to determine the total cost from CG to AEP based on the received reverse metric, as follows:

Total cost from CG to AEP=(cost(CG-to-ABR)+cost (ABR-to-Egress Point)).

That is, selecting the egress point includes selecting an egress point having a lowest total cost from the client group to the egress point defined as a sum of the cost from the client group to the area border network device plus the cost from the area border network device to the egress point. Based on the determined total cost, RR 20 then selects an AEP to use for sending traffic received from the client group and destined for each routing prefix (508). For example, RR 20 may select the AEP having the least total cost. After selecting the AEP, RR 20 sends a message to the routers in the client group identifying the selected AEP as the next hop for the routing prefix (510). For example, RR 20 may send a "BGP-ADD-PATH" message advertising the selected AEP to all the routers in the client group.

Client group routers receive the respective messages from RR 20 (512) and store the advertised next hop to routing information (514). Clients from the client group subsequently send traffic destined for a routing prefix, and do so based on their stored routing information (518). For example, client 24B sends network traffic destined for a route associated with routing prefix 18A. Client 24B uses the correct AEP as the BGP next hop for the routing prefix according to the routing information, and sends traffic destined for the routing prefix towards the correct AEP. The AEP receives the traffic destined for the routing prefix (520), and forwards the traffic to the routing prefix (522).

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer-readable storage media may include non-transitory computer-readable storage media and transient communication media. Computer readable storage media, which is tangible and non-transient, may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer-readable storage media. It should be understood that the term "computer-readable storage media" refers to physical storage media, and not signals, carrier waves, or other transient media.

Various aspects of the techniques have been described. These and other aspects are within the scope of the following claims.

What is claimed is:

1. A method comprising:
   by a first network device positioned on a border of a first area of a multi-area hierarchical network and a second area of the multi-area hierarchical network, determining a first cost associated with sending network traffic from a client group to the first network device, wherein the client group is positioned in the first area, the first area and the second area being distinct routing domains of the multi-area hierarchical network, wherein determining the first cost associated with sending network traffic from a client group to the first network device comprises performing a modified shortest-path first (SPF) path selection process with the first network device as a source, wherein the modified SPF path selection process utilizes a cost of an incoming interface of the first network device rather than an outgoing interface of the first network device to determine the first cost; and
   outputting, by the first network device to a second network device positioned in the second area, a routing advertisement message that specifies (1) the first cost and (2) a second cost associated with sending network traffic from the first network device to the client group, the first cost being different from the second cost, wherein the routing advertisement message specifies the first cost in a sub-type-length-value (sub-TLV) of the routing advertisement message designated for carrying the first cost determined using the modified SPF path selection process.

2. The method of claim 1, wherein the first area and the second area comprise different interior gateway protocol (IGP) areas of the multi-area hierarchical network, wherein the multi-area hierarchical network comprises a single administrative domain.

3. The method of claim 1, wherein the routing advertisement message comprises an Open Shortest Path First (OSPF) advertisement, wherein sub-TLV comprises a sub-type-length-value (sub-TLV) of the OSPF advertisement.

4. The method of claim 3, further comprising by the first network device, generating the OSPF advertisement, wherein the sub-TLV comprises a sub-TLV of an OSPFv2 Extended Prefix TLV of the OSPF advertisement.

5. The method of claim 1, wherein the routing advertisement message comprises an Intermediate System-to-Intermediate System (IS-IS) advertisement, wherein sub-TLV comprises a sub-TLV of the IS-IS advertisement.

6. The method of claim 5, further comprising by the first network device, generating the IS-IS advertisement, wherein the sub-TLV comprises a sub-TLV of an Extended-Internet Protocol (IP) Reachability TLV of the IS-IS advertisement.

7. The method of claim 1, wherein the second network device comprises a route reflector of the second area, the method further comprising:

receiving, by the route reflector, the routing advertisement message that specifies the first cost; and in response to receiving the routing advertisement message that specifies the first cost in the sub-TLV, selecting, by the route reflector and based on the first cost from the client group to the first network device, an egress point from among a plurality of egress points of the multi-area hierarchical network to which to send traffic from the client group destined for a destination reachable via the plurality of egress points.

8. The method of claim 1, wherein the second network device comprises a centralized controller of the second area, the method further comprising:

receiving, by the centralized controller, the routing advertisement message that specifies the first cost; and in response to receiving the routing advertisement message, updating data associated with the first area in a topology database based on the first cost.

9. The method of claim 1, further comprising:

determining the second cost associated with sending network traffic from the first network device to the client group based at least in part on performing an SPF path selection process using a cost of the outgoing interface of the first network device, wherein the incoming interface and the outgoing interface are coupled to a common link.

10. A method comprising:

receiving, by a route reflector network device positioned in a first area of a multi-area hierarchical network, from an area border network device positioned on a border of the first area and a second area of the multi-area hierarchical network, a routing advertisement message that specifies a first cost associated with sending network traffic from a client group to the area border network device and a second cost associated with sending network traffic from the area border network device to the client group, the first cost being different from the second cost, wherein the routing advertisement message specifies the first cost in a sub-type-length-value (sub-TLV) of the routing advertisement message designated for carrying the first cost, and wherein the client group is positioned in the first area, the first area and the second area being distinct routing domains of the multi-area hierarchical network; and in response to receiving the routing advertisement message that specifies the first cost in the sub-TLV, selecting, by the route reflector network device and based on the first cost from the client group to the area border network device, an egress point from among a plurality of egress points of the multi-area hierarchical network to which to send traffic from the client group destined for a destination reachable via the plurality of egress points.

11. The method of claim 10, further comprising:

sending, by the route reflector network device, a routing protocol message advertising the selected egress point to routers in the client group.

12. The method of claim 11, wherein the routing protocol message comprises a Border Gateway Protocol (BGP)-ADD-PATH message.

13. The method of claim 10, wherein the first area and the second area comprise different interior gateway protocol (IGP) areas of the multi-area hierarchical network, wherein the multi-area hierarchical network comprises a single administrative domain.

14. The method of claim 10, wherein the routing advertisement message comprises an Open Shortest Path First (OSPF) advertisement, wherein sub-TLV comprises a sub-type-length-value (sub-TLV) of the OSPF advertisement.

15. The method of claim 14, wherein the sub-TLV comprises a sub-TLV of an OSPFv2 Extended Prefix TLV of the OSPF advertisement.

16. The method of claim 10, wherein the routing advertisement message comprises an Intermediate System-to-Intermediate System (IS-IS) advertisement wherein sub-TLV comprises a sub-TLV of the IS-IS advertisement.

17. The method of claim 10, wherein the sub-TLV comprises a sub-TLV of an Extended-Internet Protocol (IP) Reachability TLV of the IS-IS advertisement.

18. The method of claim 10, wherein selecting the egress point comprises selecting an egress point having a lowest total cost from the client group to the egress point defined as a sum of the first cost from the client group to the area border network device plus a cost from the area border network device to the egress point.

19. A network device positioned on a border of a first area of a multi-area hierarchical network and a second area of the multi-area hierarchical network, the network device comprising:

a memory configured to store instructions; and one or more processors in communication with the memory and configured to:

determine a first cost associated with sending network traffic from a client group to the network device, wherein the client group is positioned in the first area, the first area and the second area being distinct routing domains of the multi-area hierarchical network, wherein determining the first cost associated with sending network traffic from a client group to the network device comprises performing a modified shortest-path first (SPF) path selection process with the network device as a source, wherein the modified SPF path selection process utilizes a cost of an incoming interface of the network device rather than an outgoing interface of the network device to determine the first cost; and output, to a second network device positioned in the second area, a routing advertisement message that specifies (1) the first cost and (2) a second cost associated with sending network traffic from the first network device to the client group, the first cost being different from the second cost, wherein the routing advertisement message specifies the first cost in a sub-type-length-value (sub-TLV) of the routing advertisement message designated for carrying the first cost determined using the modified SPF path selection process.

20. The network device of claim 19, wherein the routing advertisement message comprises an Open Shortest Path First (OSPF) advertisement, wherein sub-TLV comprises a sub-type-length-value (sub-TLV) of the OSPF advertisement.

21. The network device of claim 19, wherein the routing advertisement message comprises an Intermediate System-to-Intermediate System (IS-IS) advertisement, wherein sub-TLV comprises a sub-TLV of the IS-IS advertisement.

22. A network device positioned in a first area of a multi-area hierarchical network, the network device comprising:

a memory configured to store instructions; and one or more processors in communication with the memory and configured to:

receive, from an area border network device positioned on a border of the first area and a second area of the multi-area hierarchical network, a routing advertisement message that specifies a first cost associated with sending network traffic from a client group to the area border network device and a second cost associated with sending network traffic from the area border network device to the client group, the first cost being different from the second cost, wherein the routing advertisement message specifies the first cost in a sub-type-length-value (sub-TLV) of the routing advertisement message designated for carrying the first cost, and wherein the client group is positioned in the first area, the first area and the second area being distinct routing domains of the multi-area hierarchical network; and in response to receiving the routing advertisement message that specifies the first cost in the sub-TLV, select based on the first cost from the client group to the area border network device, an egress point from among a plurality of egress points of the multi-area hierarchical network to which to send traffic from the client group destined for a destination reachable via the plurality of egress points.

23. The network device of claim 22, wherein the network device comprises a route reflector network device.

24. The network device of claim 22, wherein the routing advertisement message comprises an Open Shortest Path First (OSPF) advertisement, wherein sub-TLV comprises a sub-type-length-value (sub-TLV) of the OSPF advertisement.

25. The network device of claim 22, wherein the routing advertisement message comprises an Intermediate System-to-Intermediate System (IS-IS) advertisement, wherein sub-TLV comprises a sub-TLV of the IS-IS advertisement.

26. The network device of claim 22, wherein the one or more processors are configured to select an egress point having a lowest total cost from the client group to the egress point defined as a sum of the first cost from the client group to the area border network device plus a cost from the area border network device to the egress point.

27. A non-transitory computer-readable medium comprising instructions that, when executed, cause one or more processors of a network device to:

determine a first cost associated with sending network traffic from a client group to the network device, wherein the client group is positioned in the first area of a multi-area hierarchical network, wherein determining the first cost associated with sending network traffic from a client group to the network device comprises performing a modified shortest-path first (SPF) path selection process with the network device as a source, wherein the modified SPF path selection process utilizes a cost of an incoming interface of the network device rather than an outgoing interface of the network device to determine the first cost; and output to a second network device positioned in a second area of the multi-area hierarchical network, a routing advertisement message that specifies (1) the first cost and (2) a second cost associated with sending network traffic from the first network device to the client group, the first cost being different from the second cost, the first area and the second area being distinct routing domains of the multi-area hierarchical network, wherein the routing advertisement message specifies the first cost in a sub-type-length-value (sub-TLV) of the routing advertisement message, the sub-TLV indicating the first cost determined using the modified SPF path selection process.

28. A non-transitory computer-readable device comprising instructions that, when executed, cause one or more processors of a network device to:

receive, from an area border network device positioned on a border of a first area and a second area of a multi-area hierarchical network, a routing advertisement message that specifies a first cost associated with sending network traffic from a client group to the area border network device and a second cost associated with sending network traffic from the area border network device to the client group, the first cost being different from the second cost, wherein the routing advertisement message specifies the first cost in a sub-type-length-value (sub-TLV) of the routing advertisement message designated for carrying the first cost, and wherein the client group is positioned in the first area, the first area and the second area being distinct routing domains of the multi-area hierarchical network; and in response to receiving the routing advertisement message that specifies the first cost in the sub-TLV, select based on the first cost from the client group to the area border network device, an egress point from among a plurality of egress points of the multi-area hierarchical network to which to send traffic from the client group destined for a destination reachable via the plurality of egress points.

* * * * *